United States Patent
Cheruel

(10) Patent No.: US 8,904,059 B2
(45) Date of Patent: Dec. 2, 2014

(54) METHOD FOR CONTROLLING A DATA TRANSFER ON A SERIAL TRANSMISSION DATA TRANSFER BUS

(75) Inventor: Fabrice Cheruel, Mulsanne (FR)

(73) Assignee: ST-Ericsson SA, Plan-les-Ouates (CH)

( * ) Notice: Subject to any disclaimer, the term of this patent is extended or adjusted under 35 U.S.C. 154(b) by 455 days.

(21) Appl. No.: 13/256,157

(22) PCT Filed: Feb. 22, 2010

(86) PCT No.: PCT/EP2010/052190
§ 371 (c)(1),
(2), (4) Date: Nov. 28, 2011

(87) PCT Pub. No.: WO2010/102897
PCT Pub. Date: Sep. 16, 2010

(65) Prior Publication Data
US 2012/0059960 A1    Mar. 8, 2012

(30) Foreign Application Priority Data
Mar. 12, 2009  (FR) ..................................... 09 51554

(51) Int. Cl.
G06F 3/00      (2006.01)
H04L 12/801    (2013.01)
H04L 12/26     (2006.01)
H04L 12/825    (2013.01)

(52) U.S. Cl.
CPC ............. *H04L 47/10* (2013.01); *H04L 43/0882* (2013.01); *H04L 47/12* (2013.01); *H04L 47/13* (2013.01); *H04L 47/25* (2013.01)

USPC ........................................................... 710/29

(58) Field of Classification Search
None
See application file for complete search history.

(56) References Cited

U.S. PATENT DOCUMENTS

2003/0028626 A1* 2/2003 Hennessey et al. ........... 709/220
2005/0128951 A1* 6/2005 Chawla et al. ................. 370/235

OTHER PUBLICATIONS

Jeffrey S. Chase et al: "End System Optimizations for High-Speed TCP" IEEE Communications Magazine, vol. 39, No. 4, Apr. 1, 2001, pp. 68-74.
Patent Cooperation Treaty International Search Report and Written Opinion for PCT/EP2010/052190; Apr. 12, 2010; 14 pages (with English translation and translation certification).
Rapport de Recherche Preliminaire; Institut National de la Propriete Industrielle (French Search Report); Mario Ghidini; Jul. 17, 2009, 6 pages.

* cited by examiner

*Primary Examiner* — Henry Tsai
*Assistant Examiner* — Juanito Borromeo
(74) *Attorney, Agent, or Firm* — Howison & Arnott, LLP

(57) ABSTRACT

Method for controlling a data transfer on a serial transmission data transfer bus by means of a central processing unit and associated system. The method includes various steps, including determining an available bandwidth for a data bus, determining an available computing capacity percentage of the central processing unit, and determining a maximum data rate that a data transfer can be performed on the data bus based on the available bandwidth and the available computing capacity percentage. Furthermore, the method provides that the data transfer rate is controlled to not exceed the maximum data rate.

7 Claims, 2 Drawing Sheets

METHOD FOR CONTROLLING A DATA TRANSFER ON A SERIAL TRANSMISSION DATA TRANSFER BUS

CROSS-REFERENCE TO RELATED APPLICATIONS

This application is a U.S. National Phase application submitted under 35 U.S.C. §371 of Patent Cooperation Treaty application serial no. PCT/EP2010/052190, filed Feb. 22, 2010, and entitled METHOD FOR CONTROLLING A DATA TRANSFER ON A SERIAL TRANSMISSION DATA TRANSFER BUS, which application claims priority to French patent application serial no. 0951554, filed Mar, 12, 2009, and entitled METHOD FOR CONTROLLING A DATA TRANSFER ON A SERIAL TRANSMISSION DATA TRANSFER BUS.

Patent Cooperation Treaty application serial no. PCT/EP2010/052190, published as WO 2010/102897, and French patent application serial no. 0951554, are incorporated herein by reference.

TECHNICAL FIELD

The invention relates to controlling a data transfer on a serial transmission data transfer bus, and more particularly to the management of a data transfer on a serial transmission data transfer bus by means of a central processing unit in a mobile telephone.

BACKGROUND

Mobile telephones are increasingly integrating applications such as multimedia players. It is thus possible to transfer data from a computer to a mobile telephone or to listen to music on a mobile telephone. These applications are managed and controlled by a central processing unit, such as a processor, which also controls the data transfers via a data transfer bus between a computer, for example, and a mobile telephone. Applications such as multimedia players require a large computing capacity percentage from the central processing unit. The remaining computing capacity percentage available for the central processing unit is then limited and it is not generally possible to make other applications operate at the same time, nor to carry out a data transfer on a serial transmission data transfer bus between a computer and the mobile telephone comprising the central processing unit.

As the power of a processor of a mobile telephone is limited, when a data transfer on a serial transmission data transfer bus is carried out between the mobile telephone and a computer, the processor limits the applications operating at the same time. Thus, in order to be able to benefit from other applications, such as a multimedia player, operating during a data transfer via a data transfer bus, it is generally necessary to have recourse to a more powerful processor or to an external coprocessor with an external random access memory.

However, in a mobile telephone, the space and the power of the processors are limited.

SUMMARY

It is therefore proposed to overcome the disadvantages mentioned above by regulating the data transfer rate on a serial transmission data transfer bus, whilst allowing an application such as a multimedia player to operate, by acting on the number of data interrupts.

According to one aspect, there is proposed, in one embodiment, a method of controlling a data transfer on a serial transmission data transfer bus by means of a central processing unit.

This method comprises the following steps:
a) an available bandwidth is determined for the bus;
b) an available computing capacity percentage is determined for the central processing unit;
c) a maximum data rate on the bus is determined on the basis of the available bandwidth and the available computing capacity percentage;
d) the data transfer on the bus is controlled on the basis of the determined maximum data rate.

The maximum data rate on the bus advantageously corresponds to the highest data rate for a computing capacity percentage of the central processing unit which is less than or equal to the available computing capacity percentage, the maximum data rate being less than or equal to the data rate corresponding the available bandwidth.

There is therefore determined an available bandwidth for the bus, which makes it possible to deliver data at an available data rate on the bus. Depending on the amount of available computing capacity percentage for the central processing unit, that is to say, the computing capacity percentage that is not used for other applications by the central processing unit, it is assessed whether the available computing capacity percentage for the central processing unit is sufficient for transferring data on the serial transmission data transfer bus with the available rate corresponding to the bandwidth available for the bus.

If the available computing capacity percentage does not make it possible to transfer the data with the available data rate, that is to say if the available data rate requires a computing capacity percentage that is too high, that is to say higher than the available computing capacity percentage, then the data rate is reduced in order to have a data rate requiring a computing capacity percentage less than or equal to the available computing capacity percentage for the central processing unit.

The sum of the computing capacity percentage of the central processing unit used for a data transfer on a bus and the computing capacity percentage of the central processing unit used for other applications is less than an operating threshold.

Thus, the total computing capacity percentage, that is to say the sum of the computing capacity percentage used for a data transfer on a bus and the computing capacity percentage used for other applications must not exceed the operating threshold in order for the data transfer and the other applications to operate.

Advantageously, the above indicated steps a) to d) are repeated before and/or during a data transfer on the bus.

Thus, if the bandwidth available for the bus varies, and/or if the computing capacity percentage available for the central processing unit varies, a new maximum data rate on the bus is determined on the basis of the new available bandwidth and/or the new available computing capacity percentage. The data transfer on the bus is then controlled on the basis of the determined new maximum data rate.

The data rate on the bus is preferably reduced by reducing the number of interrupts allocated to the data.

The data is sent in data packets with control interrupts and data interrupts. The control interrupts are responsible for controlling information sent between the data receiving device and the data sending device. Provided these control interrupts are correctly sent and correctly received, the communication over the serial transmission data bus operates. The data interrupts are responsible for transferring data. Such data interrupts can be temporarily masked without the data transfer being damaged. Thus, in order to reduce the data rate, the number of interrupts allocated to the data visible by the receiver is reduced.

By thus masking a number of interrupts allocated to the data, the central processing unit has a computing capacity percentage released which can then be dedicated to the operation of other applications. This takes place whilst maintaining an acceptable data transfer rate.

Advantageously the data rate on the bus is reduced if the maximum data rate is lower than the data rate corresponding to the available bandwidth.

According to another aspect, in one embodiment there is proposed a system for controlling a data transfer on a serial transmission data transfer bus by means of a central processing unit.

This system comprises:
first assessment means capable of determining an available bandwidth for the bus;
second assessment means capable of determining a computing capacity percentage available for the central processing unit;
rate determination means capable of determining a maximum data rate on the bus on the basis of the available bandwidth and the available computing capacity percentage; and
control means capable of controlling the data transfer on the bus on the basis of the determined maximum data rate.

Advantageously, the rate determination means comprises a checking module capable of checking that the sum of the computing capacity percentage of the central processing unit used for the data transfer on a bus and the computing capacity percentage of the central processing unit used for other applications is below an operating threshold.

The control means comprises repetition means capable of determining a bandwidth for the bus, determining a computing capacity percentage available for the central processing unit, determining a maximum data rate on the bus on the basis of the available bandwidth and the available computing capacity percentage, and controlling the data transfer on the bus on the basis of the determined maximum data rate.

The rate determination means advantageously comprises a module for regulating the rate capable of reducing the data rate on the bus by reducing the number of interrupts allocated to the data.

BRIEF DESCRIPTION OF THE DRAWINGS

Other advantages and features of the invention will appear on examining the detailed description of embodiments and implementations, which are in no way limitative, and the appended drawings in which.

DETAILED DESCRIPTION

Figure 1:
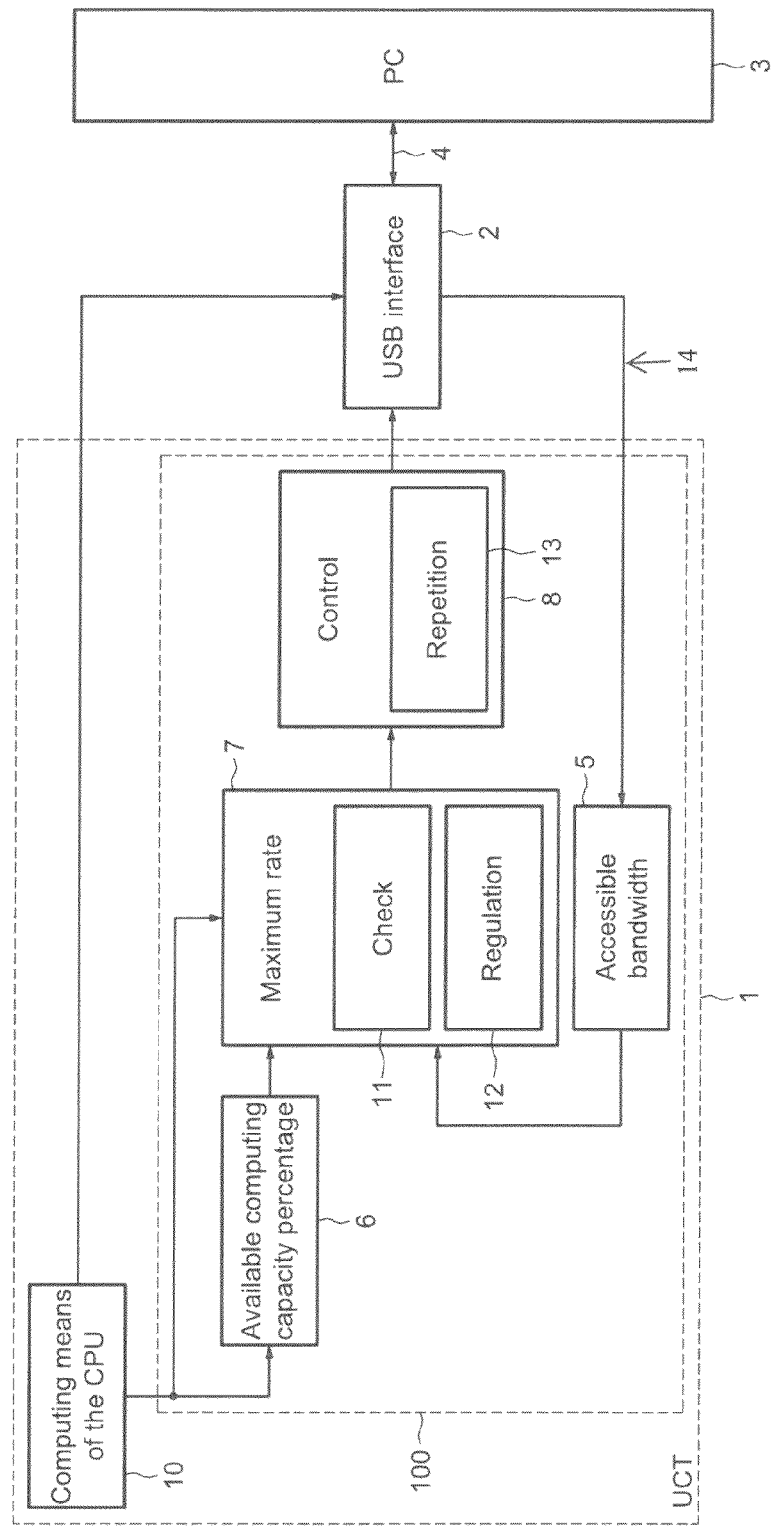
FIG. 1 is a block diagram illustrating a system for controlling a data transfer on a serial transmission data transfer bus by means of a central processing unit.

FIG. 1 is a block diagram of a system for controlling a data transfer on a serial transmission data transfer bus by means of a central processing unit 1. The central processing unit 1 is coupled with means 2 of interfacing with a serial transmission data transfer bus 4, which makes it possible to connect the mobile telephone, comprising the central processing unit 1 and the means 2 of interfacing with the bus 4, with a computer 3, for example.

The system 100 for controlling a data transfer on a serial transmission data transfer bus 4 by means of a central processing unit 1 comprises first assessing means 5 capable of determining an available bandwidth for the bus 4, second assessing means 6 capable of determining an available computing capacity percentage for the central processing unit 1, rate determination means 7 capable of determining a maximum data rate on the bus 4 on the basis of the available bandwidth and the available computing capacity percentage, and control means 8 capable of controlling the transfer of data on the bus 4 on the basis of the determined maximum data rate.

The central processing unit 1, for example a processor of a mobile telephone, controls various applications put into operation for the mobile telephone as well as data transfers, via a serial transmission data transfer bus 4, with a module external to the mobile telephone such as a USB key. The central processing unit 1 comprises computing means 10 capable of controlling the various applications put into operation by the central processing unit 1 and the interfacing means 2 of the serial transmission data transfer bus 4.

The second assessment means 6 receives an input that provides the computing capacity percentage used by the computing means 10 of the central processing unit 1 for controlling the applications put into operation within the mobile telephone by the central processing unit 1. The second assessment means 6 determines an available computing capacity percentage for the central processing unit 1. This available computing capacity percentage corresponds to the computing capacity percentage not being used by the computing means 10 of the central processing unit 1 during the operation of other applications.

The first assessment means 5 is coupled with the interfacing means 2 of the data transfer bus 4 via a connection 14. The first assessment means 5 then determines the available bandwidth for the data transfer bus 4. This available bandwidth corresponds to the bandwidth of the bus 4 that is not being used at the time of the measurement. The first assessment means 5 then supplies to the rate determination means 7 the bandwidth available for the bus 4. Meanwhile, the second assessment means 6 supplies the available computing capacity percentage for the central processing unit 1 to the rate determination means 7.

The rate determination means 7 then determines a maximum data rate that can be provided on the bus 4 on the basis of the available bandwidth given by the first assessment means 5 and on the basis of the available computing capacity percentage given by the second assessment means 6. The maximum data rate on the bus 4 thus determined corresponds to the highest data rate for a computing capacity percentage of the central processing unit 1 of less than or equal to the available computing capacity percentage given by the second assessment means 6, the maximum data rate remaining however less than or equal to the data rate corresponding to the available bandwidth given by the first assessment means 5.

Thus, if many applications requiring a large computing capacity percentage for their operation are operating on the mobile telephone, a very low computing capacity percentage of the central processing unit 1 will be available for operating the data transfer on the data transfer bus. Thus, even if a large bandwidth is available on the data transfer bus 4, the maximum data rate will be limited by the computing capacity percentage available for the central processing unit 1. Thus, the whole of the bandwidth of the data transfer bus 4 will not be used, only a small bandwidth will be used for delivering a low data rate using a low computing capacity percentage of the central processing unit 1.

On the other hand, if a large computing capacity percentage of the central processing unit 1 is available, that is to say if few or no applications are being used at the same time as a data transfer is operated, and if the bandwidth available for the data transfer on the data transfer bus 4 is small, then the maximum data rate will be limited by the available bandwidth. In fact, the data rate will be low given that the available bandwidth makes it possible to provide only a limited rate given the low available bandwidth. The available computing capacity percentage will not therefore be fully used given that for a low data rate, a low computing capacity percentage is necessary.

The rate determination means 7 capable of determining a maximum data rate on the bus 4 on the basis of the available bandwidth and the available computing capacity percentage comprises a check module 11 capable of checking that the sum of the computing capacity percentage of the central processing unit 1 used for a data transfer on a bus 4 and the computing capacity percentage of the central processing unit 1 used for other applications is less than an operating threshold. If the sum of the two computing capacity percentages is greater than this threshold, the central processing unit cannot operate the applications and the data transfer at the same time.

In some embodiments for example, the total computing capacity percentage of the central processing unit must not in general exceed 80% of the computing capacity of the central processing unit 1. Thus, if there is a computing capacity percentage of the central processing unit used for other applications corresponding to 40% and a computing capacity percentage used for a data transfer on a data transfer bus 4 at a rate of 8 megabytes per second corresponding to 50% of the computing capacity percentage of the central processing unit 1, the sum of the two computing capacity percentages is equal to 90% of the computing capacity of the central processing unit 1 and is therefore higher than the threshold of 80% making it possible to operate the applications and the data transfer. Yet, it may be necessary to reduce the total computing capacity percentage of the central processing unit 1.

Figure 2:
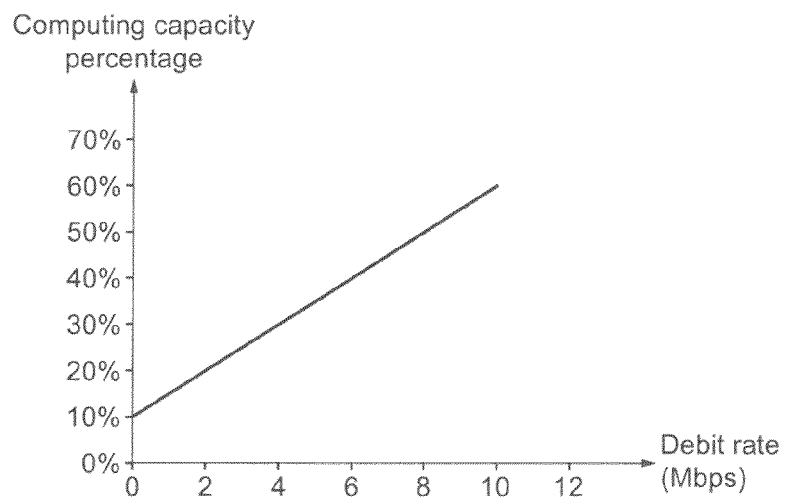
FIG. 2 illustrates the variation of the computing capacity percentage necessary for a central processing unit as a function of the data rate during a data transfer on a serial transmission data transfer bus.

The data rate used for the data transfer on the bus 4 is therefore reduced by using a data rate of 6 megabytes per second, which requires only 40% of the computing capacity of the central processing unit 1 for its operation, as shown in FIG. 2. A total computing capacity percentage of the central processing unit 1 equal to 80% is thus obtained, which is equal to the operating threshold of the central processing unit 1 and therefore makes it more possible to operate the applications and the data transfer on the data transfer bus 4 simultaneously.

FIG. 2 illustrates the computing capacity percentage of the central processing unit 1 necessary for a specific data rate on a serial transmission data transfer bus 4. For example, referring to the graph, in order to obtain a data rate of 10 megabytes per second a computing capacity percentage of the central processing unit of 60% is necessary. If such a computing capacity percentage of the central processing unit 1 is not available, the data rate is then reduced in such as way as to achieve an available processing computing capacity percentage for the central processing unit 1. For example, if the computing capacity percentage of the central processing unit used for other applications corresponds to a computing capacity percentage of 55% of the central processing unit 1, and if the operating threshold is equal to 80% of the computing capacity percentage of the central processing unit 1, it will not be possible to use a data rate of 8 megabits per second using a computing capacity percentage of 50% of the central processing unit. It will only be possible to use a maximum data rate of 3 megabits per second.

In fact, with the operating threshold being fixed at 80% of the computing capacity of the central processing unit 1, and the computing capacity percentage of the central processing unit used for other applications corresponding to 55% of the computing capacity of the central processing unit 1, only 25% of the computing capacity of the central processing unit is available, which corresponds to a maximum data rate of 3 megabytes per second in FIG. 2.

The rate determination means 7 comprises a module 12 for regulating the data rate making it possible to reduce the data rate on the bus 4 by reducing the number of interrupts allocated to the data. The data is sent in data packets with control interrupts and data interrupts.

The control interrupts are responsible for controlling the information sent between the data sender and the data receiver during a data transfer on a serial transmission data transfer bus 4. Provided these control interrupts are correctly sent and received, the data transfer will operate perfectly.

The data interrupts are responsible for the data transfer. These data interrupts can be temporarily masked, without the data transfer being interrupted. Thus, if the data rate used must be reduced with respect to the maximum usable rate, that is to say with respect to the rate corresponding to the available bandwidth, then a certain number of data interrupts, that is to say interrupts allocated to the data, will be masked whilst the control interrupts will not be masked for the correct operation of the data transfer.

Depending on the necessary reduction of the data rate, the number of unmasked data interrupts will be higher or lower with respect to the number of masked data interrupts. This sequence is repeated in a loop in such a way as to reduce the data rate during the transfer and thus to reduce the computing capacity percentage necessary for the data transfer on the data transfer bus 4. Thus, the higher the number of masked interrupts is, the greater will be the reduction of the data rate.

On the other hand, if the data rate used corresponds to the maximum possible data rate, that is to say to the data rate corresponding to the available bandwidth, then no data interrupts will be masked.

The rate determination means 7 thus provides the control means 8 with the maximum rate usable for the data transfer via a serial transmission data transfer bus 4.

The control means 8 then delivers the data rate used for the data transfer via the data transfer bus 4 to the interfacing means 2 of the serial transmission bus 4. The control means 8 also comprises repetition means 13 capable of repeating the steps making it possible to determine the maximum data rate before and/or during the data transfer. Thus, if the available bandwidth varies and/or the available computing capacity percentage of the central control unit 1 varies, a new maximum data rate can be determined and delivered to the control means 8.

Figure 3:
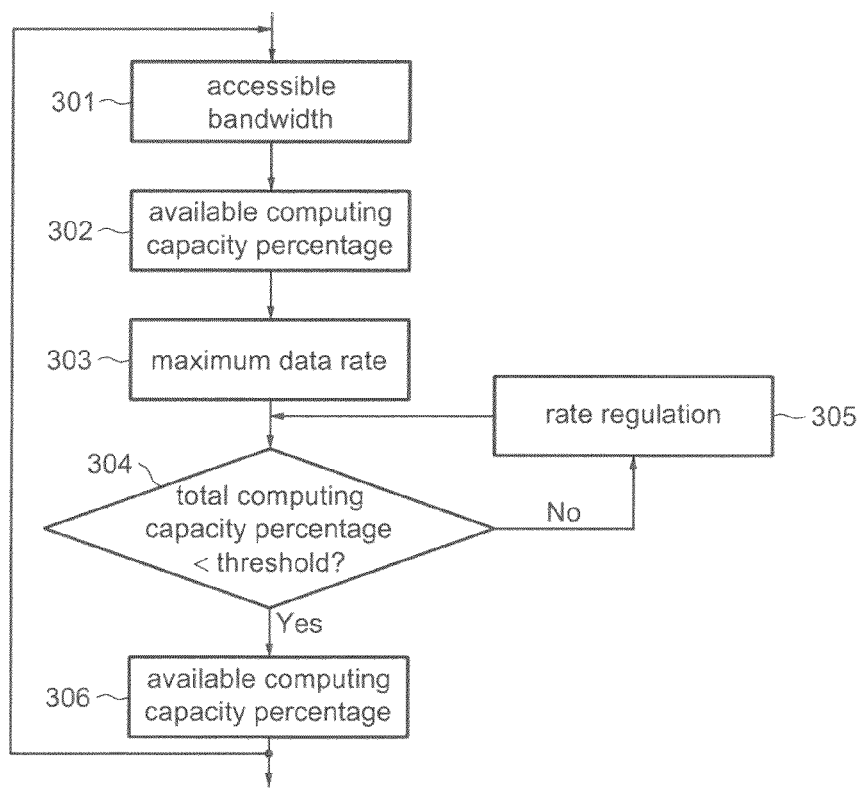
FIG. 3 is a flowchart of a method of controlling a data transfer on a serial transmission data transfer bus by means of a central processing unit.

FIG. 3 is a flowchart of a method for controlling a data transfer on a serial transmission data transfer bus 4 by means of a central processing unit 1.

In a first step 301, the available bandwidth for the serial transmission data transfer bus 4 is determined. In a next step 302, the available computing capacity percentage for the central processing unit 1 is determined. In a next step 303 a maximum data rate on the bus 4 is determined on the basis of the available bandwidth and the available computing capacity percentage.

The maximum data rate on the bus corresponds to the highest data rate for a computing capacity percentage of the central processing unit 1 of less than or equal to the available computing capacity percentage. The maximum data rate must remain less than or equal to the data rate corresponding to the available bandwidth.

In a next step 304, it is checked that the sum of the computing capacity percentage of the central processing unit 1 used for a data transfer on a bus 4 and the computing capacity percentage of the central processing unit 1 used for other applications is below an operating threshold.

If the sum of the computing capacity percentages is not below the operating threshold, then the rate is regulated by reducing the data rate on the data transfer bus 4 by reducing the number of interrupts allocated to the data. In order to do this, a certain number of data interrupts are masked. By reducing the number of data interrupts, and therefore the data rate, the computing capacity percentage of the central processing unit 1 necessary for the operation of the data transfer via the serial transmission data transfer bus 4 is reduced.

The steps 304 and 305 are repeated until the sum of the computing capacity percentages is below the operating threshold.

If, in step 304, the sum of the computing capacity percentages is actually below the operating threshold, then, in a final step 306, the data transfer on the serial transmission data transfer bus 4 is controlled using the determined maximum data rate.

The invention claimed is:

1. A method of controlling data transfer on a serial transmission data transfer bus by a central processing unit, the method comprising:
   determining an available bandwidth of the serial transmission data transfer bus;
   determining an available computing capacity of the central processing unit;
   determining a maximum data rate that data can be transferred on the serial transmission data transfer bus based on a combination of the available bandwidth and the available computing capacity; and
   controlling the data transfer rate on the bus based on the determined maximum data rate;
   wherein the maximum data rate on the serial transmission data transfer bus corresponds to a highest data rate for a computing capacity percentage of the central processing unit;
   wherein the computing capacity percentage is less than or equal to the available computing capacity percentage;
   wherein the maximum data rate is less than or equal to the data rate corresponding to the available bandwidth; and
   wherein a sum of the computing capacity percentage used for data transfer and the computing capacity percentage used for other applications is less than an operating threshold, wherein the operating threshold is a fixed percentage below the computing capacity of the central processor; and
   wherein controlling the data transfer rate further comprises decreasing the data rate on the serial transmission data transfer bus by reducing a number of data interrupts allocated to the data being transferred when the maximum data rate is lower than the available bandwidth.

2. The method of claim 1, wherein the determining steps are repeated immediately before or during a data transfer on the serial transmission data transfer bus.

3. A system for controlling a data transfer on a serial transmission data transfer bus comprising:
   a central processing unit comprising:
      a bus assessment module configured to assess an available bandwidth on the serial transmission data transfer bus;
      a processing capacity module configured to determine an available computing capacity percentage of the central processing unit;
      a maximum data rate module configured to determine a maximum data rate for the serial transmission data transfer bus based on the available bandwidth and the available computing capacity percentage, wherein the maximum data rate module comprises a check module configured to check that a sum of the computing capacity percentage of the central processing unit being used for the data transfer on the serial transmission data transfer bus and the computing the computing capacity percentage of the central processing unit being used for other applications below an operating threshold, wherein the operating threshold is a fixed percentage below the computing capacity of the central processor; and
      a control module configured to control a data transfer rate on the serial transmission data transfer bus based on the maximum data rate.

4. The system of claim 3, wherein the control module comprises a repetition module adapted to repeatedly set a transfer bandwidth for transferring data on the serial transmission data transfer bus, to repeatedly set a computing capacity percentage to be used for transferring data on the serial transmission data transfer bus, to repeatedly update the maximum data rate on the serial transmission data transfer bus based the available bandwidth and the available computing capacity percentage, and adapted to control the data transfer on the serial transmission data transfer bus based on updated maximum data rate.

5. The system of claim 3, wherein the maximum data rate module comprises a regulation module adapted to reduce the data rate for transferring data on the serial transmission data transfer bus by reducing a number of interrupts allocated to the data being transferred when the maximum data rate is lower than the available bandwidth.

6. A system for controlling a serial data transfer rate between a mobile communication device and an external device comprising:
   a serial bus interface; and
   a processing unit within the mobile communication device, the processing unit configured to provide control of a data transfer rate of the serial bus interface based on a combination of a maximum data transfer rate available on the serial interface, a percentage of available processing capacity of the processing unit, and a percentage of processing capacity necessary to produce a predetermined data transfer rate, such that the data transfer rate does not exceed the maximum data rate available and the percentage of available processing capacity necessary to produce the data transfer rate does not exceed the percentage of available processing capacity, wherein the processing unit is further configured to decrease the data transfer rate when either the data transfer rate exceeds the available maximum data rate available or when the percentage of available processing capacity is not large enough to produce the maximum data transfer rate available on the serial interface, the processing unit configured to decrease a number of data transfer interrupts by a determined amount in order to decrease the data transfer rate.

7. The system of claim 6, wherein the processing unit is further adapted to substantially continuously monitor the maximum transfer rate available on the serial interface and the percentage of available processing capacity of the processing unit.

* * * * *